United States Patent
Wang et al.

(10) Patent No.: US 11,962,352 B2
(45) Date of Patent: Apr. 16, 2024

(54) OPTICAL SWITCH AND OPTICAL PERFORMANCE MONITORING METHOD BASED ON OPTICAL SWITCH

(71) Applicant: Huawei Technologies Co., Ltd., Shenzhen (CN)

(72) Inventors: Liang Wang, Wuhan (CN); Yan Meng, Wuhan (CN); Jiang Tang, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/933,166

(22) Filed: Sep. 19, 2022

(65) Prior Publication Data

US 2023/0013921 A1 Jan. 19, 2023

Related U.S. Application Data

(63) Continuation of application No. PCT/CN2021/080961, filed on Mar. 16, 2021.

(30) Foreign Application Priority Data

Mar. 20, 2020 (CN) .......................... 202010205015.7

(51) Int. Cl.
*H04J 14/00* (2006.01)
*H04B 10/61* (2013.01)
*H04J 14/02* (2006.01)

(52) U.S. Cl.
CPC ........ *H04B 10/614* (2013.01); *H04J 14/0202* (2013.01); *H04J 14/0215* (2013.01)

(58) Field of Classification Search
CPC .... H04J 14/02; H04J 14/0202; H04J 14/0215; H04J 14/0212; H04Q 11/0003;
(Continued)

(56) References Cited

U.S. PATENT DOCUMENTS

| 5,867,289 A | 2/1999 | Gerstel et al. |
| 6,559,984 B1 | 5/2003 | Lee et al. |

(Continued)

FOREIGN PATENT DOCUMENTS

| CN | 1267156 A | 9/2000 |
| CN | 1422465 A | 6/2003 |

(Continued)

*Primary Examiner* — Hanh Phan
(74) *Attorney, Agent, or Firm* — Slater Matsil, LLP (57) ABSTRACT

Embodiments of this application disclose an optical switch. The optical switch includes at least one first port, at least one second port, a first wavelength division multiplexing WDM apparatus, an optical splitter, an optical monitoring apparatus, and an optical switching apparatus. The first port is configured to transmit an input first optical signal to the first WDM apparatus, where the first optical signal is a multi-wavelength signal. The first WDM apparatus is configured to demultiplex the first optical signal. The optical splitter is configured to split a demultiplexed first optical signal to obtain a first sub-signal and a second sub-signal. The optical switching apparatus is configured to perform optical switching on the first sub-signal. The second port is configured to output a first sub-signal obtained after optical switching. The optical monitoring apparatus is configured to perform optical performance monitoring on the second sub-signal.

20 Claims, 4 Drawing Sheets

(58) Field of Classification Search
CPC ........... H04Q 11/0005; H04Q 11/0062; H04Q 11/0066; H04Q 11/0067; H04B 10/07953; H04B 10/0795; H04B 10/07955; H04B 10/2057
USPC ........ 398/45, 46, 47, 48, 49, 50, 51, 52, 53, 398/54, 55, 56, 57, 58, 79, 158, 159, 33, 398/38, 25, 26, 27, 82, 83; 385/24, 37, 385/16, 17, 18
See application file for complete search history.

(56) References Cited

U.S. PATENT DOCUMENTS

| | | | | |
|---|---|---|---|---|
| 6,798,941 B2* | 9/2004 | Smith | .................... | G02B 6/266 385/18 |
| 6,980,737 B1* | 12/2005 | Anslow | ............ | H04B 10/07953 375/321 |
| 8,131,123 B2* | 3/2012 | Presley | .............. | G02B 6/29313 385/47 |
| 2002/0141009 A1* | 10/2002 | Yu | ...................... | H04Q 11/0005 398/9 |
| 2005/0213978 A1* | 9/2005 | Yamashita | .......... | H04J 14/0213 398/79 |
| 2006/0013585 A1* | 1/2006 | Hnatiw | ............... | H04J 14/0221 398/38 |
| 2007/0274725 A1 | 11/2007 | Takeyama et al. | | |
| 2008/0181607 A1* | 7/2008 | Goodwill | ............. | H04B 10/801 398/50 |

FOREIGN PATENT DOCUMENTS

| | | |
|---|---|---|
| CN | 1863026 A | 11/2006 |
| CN | 101309113 A | 11/2008 |
| CN | 104635334 A | 5/2015 |
| CN | 209148907 U | 7/2019 |
| EP | 0920153 A2 | 6/1999 |

* cited by examiner

Spots distributed on an optical switching apparatus

Spots distributed on an optical monitoring apparatus

OPTICAL SWITCH AND OPTICAL PERFORMANCE MONITORING METHOD BASED ON OPTICAL SWITCH

CROSS-REFERENCE TO RELATED APPLICATIONS

This application is a continuation of International Application No. PCT/CN2021/080961, filed on Mar. 16, 2021, which claims priority to Chinese Patent Application No. 202010205015.7, filed on Mar. 20, 2020. The disclosures of the aforementioned applications are hereby incorporated by reference in their entireties.

TECHNICAL FIELD

This application relates to the optical communication field, and in particular, to an optical switch and an optical performance monitoring method based on an optical switch.

BACKGROUND

In an optical communication long-distance transmission network, optical-to-electrical conversion in a system link tends to be reduced. It becomes increasingly difficult to directly test a bit error rate at an electrical layer, and it is not conducive to fault locating when the bit error rate is tested only at a link terminal. As a transmission capacity is increased and flexibility is improved in an optical network, system complexity is becoming increasingly higher. To effectively control and manage an optical network, optical performance monitoring (OPM) is increasingly more important for high-speed dense wavelength division multiplexing (DWDM) signals in the optical network.

Currently, in a solution of performing OPM, an external OPM module is used outside a wavelength selective switch (WSS), and some of optical signals originally input to the WSS are input to the OPM module. The OPM module may perform wavelength demultiplexing on the input optical signals in a time or space dimension, so as to implement single-wavelength performance monitoring. However, additionally arranging the OPM module outside the WSS significantly increases a system size, which is not conducive to system miniaturization.

SUMMARY

Embodiments of this application provide an optical switch and an optical performance monitoring method based on an optical switch. An optical monitoring apparatus is integrated into the optical switch, and an existing apparatus in the optical switch may be reused to perform optical performance monitoring on a demultiplexed optical signal, so as to implement system miniaturization.

According to a first aspect, this application provides an optical switch, including at least one first port, at least one second port, a first wavelength division multiplexing WDM apparatus, an optical splitter, an optical monitoring apparatus, and an optical switching apparatus. The first port is configured to transmit an input first optical signal to the first WDM apparatus, where the first optical signal is a multi-wavelength signal. The first WDM apparatus is configured to demultiplex the first optical signal. The optical splitter is configured to split a demultiplexed first optical signal to obtain a first sub-signal and a second sub-signal. The optical switching apparatus is configured to perform optical switching on the first sub-signal. The second port is configured to output a first sub-signal obtained after optical switching. The optical monitoring apparatus is configured to perform optical performance monitoring on the second sub-signal.

In this implementation, the optical splitter may split the demultiplexed optical signal into two bundles of signals, where one bundle of signals is input to the optical switching apparatus for optical switching, and the other bundle of signals is input to the optical monitoring apparatus for optical performance monitoring. In this design manner, the optical monitoring apparatus is integrated into the optical switch, and an existing apparatus in the optical switch may be reused to perform optical performance monitoring on the demultiplexed optical signal, so as to implement system miniaturization.

In some possible implementations, spots of the first sub-signal distributed on the optical switching apparatus are the same as spots of the second sub-signal distributed on the optical monitoring apparatus. It should be understood that, to minimize crosstalk, maximize a separation degree, and optimize distribution linearity between wavelength signals, spots of the wavelength signals distributed on the optical switching apparatus are minimum. Therefore, spots of the wavelength signals distributed on the optical monitoring apparatus 105 are also minimum, so that overlapping between the spots is avoided, and monitoring is easy.

In some possible implementations, the optical switch further includes a beam shaping apparatus. The beam shaping apparatus is configured to shape the input first optical signal. The first WDM apparatus is specifically configured to demultiplex a shaped first optical signal. In this implementation, shaping a beam may reduce a beam divergence angle and improve beam quality.

In some possible implementations, the optical switch further includes a beam collimation apparatus. The beam collimation apparatus is configured to perform beam collimation on the demultiplexed first optical signal. The optical splitter is specifically configured to split a beam-collimated first optical signal to obtain the first sub-signal and the second sub-signal. In this implementation, demultiplexed wavelength signals may be spatially angularly separated. Therefore, beam collimation on each demultiplexed wavelength signal may facilitate convergence of each wavelength signal to the optical splitter.

In some possible implementations, the optical switch further includes a second WDM apparatus. The second WDM apparatus is configured to multiplex the first sub-signal obtained after optical switching. The second port is specifically configured to output a multiplexed first sub-signal. It should be understood that, after optical switching is completed, wavelength signals also need to be multiplexed before being output, and multiplexing is implemented by using the second WDM apparatus, thereby improving practicality of this solution.

In some possible implementations, the second port is further configured to transmit an input second optical signal to the second WDM apparatus, where the second optical signal is a multi-wavelength signal. The second WDM apparatus is further configured to demultiplex the second optical signal. The optical switching apparatus is further configured to perform optical switching on a demultiplexed second optical signal. The optical splitter is further configured to split a second optical signal obtained after optical switching to obtain a third sub-signal and a fourth sub-signal. The first WDM apparatus is further configured to multiplex the third sub-signal. The first port is further configured to output a multiplexed third sub-signal. The optical monitoring apparatus is configured to perform optical performance monitoring on the fourth sub-signal. In this implementation, ports on two sides of the optical switch may be mutually input and output ports. In this case, the optical switching apparatus may perform optical switching on optical signals in two different directions, and the optical monitoring apparatus may also perform optical performance monitoring on optical signals in two different directions, thereby improving scalability of this solution.

In some possible implementations, the optical monitoring apparatus is specifically configured to monitor optical power of each wavelength signal in the second sub-signal. Alternatively, the optical monitoring apparatus is specifically configured to monitor a frequency offset of each wavelength signal in the second sub-signal. It should be understood that optical performance monitoring may include monitoring of a plurality of parameters, such as optical power and an optical signal-to-noise ratio (OSNR). These parameters become important content of optical performance monitoring, and contribute to damage suppression, fault locating, degradation probing, backup, recovery, and the like of an optical network, thereby facilitating stable operation of the optical network.

In some possible implementations, types of the optical monitoring apparatus include at least a photodiode array (PDA), a charge coupled device (CCD), and a complementary metal-oxide-semiconductor (CMOS). A type of the first WDM apparatus includes at least a grating. Types of the optical switching apparatus include at least a liquid crystal on silicon (LCOS) and a micro-electro-mechanical system (MEMS).

According to a second aspect, this application provides an optical switch, including at least one first port, at least one second port, a first wavelength division multiplexing WDM apparatus, an optical splitter, an optical monitoring apparatus, and an optical switching apparatus. The first port is configured to transmit an input first optical signal to the first WDM apparatus, where the first optical signal is a multi-wavelength signal. The first WDM apparatus is configured to demultiplex the first optical signal. The optical switching apparatus is configured to perform optical switching on the first optical signal. The optical splitter is configured to split a first optical signal obtained after optical switching to obtain a first sub-signal and a second sub-signal. The second port is configured to output the first sub-signal. The optical monitoring apparatus is configured to perform optical performance monitoring on the second sub-signal.

It may be understood that, different from the optical switch provided in the first aspect in which each demultiplexed wavelength signal is first split and then separately undergoes optical switching and optical monitoring, in the optical switch provided in the second aspect, each demultiplexed wavelength signal may first undergo optical switching. After optical switching, the wavelength signal is split. One bundle of signals obtained after splitting is output from the second port, and the other bundle of signals is input to the optical monitoring apparatus for optical performance monitoring. Thus, a structure of the optical switch provided in this application is enriched.

In some possible implementations, spots of the first optical signal distributed on the optical switching apparatus are the same as spots of the second sub-signal distributed on the optical monitoring apparatus.

In some possible implementations, the optical switch further includes a beam shaping apparatus. The beam shaping apparatus is configured to shape the input first optical signal. The first WDM apparatus is specifically configured to demultiplex a shaped first optical signal.

In some possible implementations, the optical switch further includes a beam collimation apparatus. The beam collimation apparatus is configured to perform beam collimation on the demultiplexed first optical signal. The optical switching apparatus is specifically configured to perform optical switching on a beam-collimated first optical signal.

In some possible implementations, the optical switch further includes a second WDM apparatus. The second WDM apparatus is configured to multiplex the first sub-signal. The second port is specifically configured to output a multiplexed first sub-signal.

In some possible implementations, the second port is further configured to transmit an input second optical signal to the second WDM apparatus, where the second optical signal is a multi-wavelength signal. The second WDM apparatus is further configured to demultiplex the second optical signal. The optical splitter is further configured to split a demultiplexed second optical signal to obtain a third sub-signal and a fourth sub-signal. The optical switching apparatus is further configured to perform optical switching on the third sub-signal. The first port is further configured to output a third sub-signal obtained after optical switching. The optical monitoring apparatus is further configured to perform optical performance monitoring on the fourth sub-signal.

In some possible implementations, the optical monitoring apparatus is specifically configured to monitor optical power of each wavelength signal in the second sub-signal. Alternatively, the optical monitoring apparatus is specifically configured to monitor a frequency offset of each wavelength signal in the second sub-signal.

In some possible implementations, types of the optical monitoring apparatus include at least a PDA, a CCD, and a CMOS. A type of the first WDM apparatus includes at least a grating. Types of the optical switching apparatus include at least an LCOS and an MEMS.

According to a third aspect, this application provides an optical performance monitoring method based on an optical switch, where the optical switch includes at least one first port, at least one second port, a first wavelength division multiplexing WDM apparatus, an optical splitter, an optical monitoring apparatus, and an optical switching apparatus. The method includes: transmitting an input first optical signal to the first WDM apparatus by using the first port, where the first optical signal is a multi-wavelength signal; demultiplexing the first optical signal by using the first WDM apparatus; splitting a demultiplexed first optical signal by using the optical splitter to obtain a first sub-signal and a second sub-signal; performing optical switching on the first sub-signal by using the optical switching apparatus; outputting, by using the second port, a first sub-signal obtained after optical switching; and performing optical performance monitoring on the second sub-signal by using the optical monitoring apparatus.

In some possible implementations, spots of the first sub-signal distributed on the optical switching apparatus are the same as spots of the second sub-signal distributed on the optical monitoring apparatus.

In some possible implementations, the optical switch further includes a beam shaping apparatus. The method further includes: shaping the input first optical signal by using the beam shaping apparatus; and specifically demultiplexing a shaped first optical signal by using the first WDM apparatus.

In some possible implementations, the optical switch further includes a beam collimation apparatus. The method further includes: performing beam collimation on a demultiplexed first optical signal by using the beam collimation apparatus; and specifically splitting a beam-collimated first optical signal by using the optical splitter, to obtain the first sub-signal and the second sub-signal.

In some possible implementations, the optical switch further includes a second WDM apparatus. The method further includes: multiplexing, by using the second WDM apparatus, the first sub-signal obtained after optical switching; and outputting a multiplexed first sub-signal by using the second port.

In some possible implementations, the method further includes: transmitting an input second optical signal to the second WDM apparatus by using the second port, where the second optical signal is a multi-wavelength signal; demultiplexing the second optical signal by using the second WDM apparatus; performing optical switching on a demultiplexed second optical signal by using the optical switching apparatus; splitting, by using the optical splitter, a second optical signal obtained after optical switching to obtain a third sub-signal and a fourth sub-signal; multiplexing the third sub-signal by using the first WDM apparatus; outputting a multiplexed third sub-signal by using the first port; and performing optical performance monitoring on the fourth sub-signal by using the optical monitoring apparatus.

In some possible implementations, the performing optical performance monitoring on the second sub-signal by using the optical monitoring apparatus includes: monitoring optical power of each wavelength signal in the second sub-signal by using the optical monitoring apparatus; or monitoring a frequency offset of each wavelength signal in the second sub-signal by using the optical monitoring apparatus.

In some possible implementations, types of the optical monitoring apparatus include at least a PDA, a CCD, and a CMOS. A type of the first WDM apparatus includes at least a grating. Types of the optical switching apparatus include at least an LCOS and an MEMS.

According to a fourth aspect, this application provides an optical performance monitoring method based on an optical switch, where the optical switch includes at least one first port, at least one second port, a first wavelength division multiplexing WDM apparatus, an optical splitter, an optical monitoring apparatus, and an optical switching apparatus. The method includes: transmitting an input first optical signal to the first WDM apparatus by using the first port, where the first optical signal is a multi-wavelength signal; demultiplexing the first optical signal by using the first WDM apparatus; performing optical switching on the first optical signal by using the optical switching apparatus; splitting, by using the optical splitter, a first optical signal obtained after optical switching to obtain a first sub-signal and a second sub-signal; outputting the first sub-signal by using the second port; and performing optical performance monitoring on the second sub-signal by using the optical monitoring apparatus.

In some possible implementations, spots of the first optical signal distributed on the optical switching apparatus are the same as spots of the second sub-signal distributed on the optical monitoring apparatus.

In some possible implementations, the optical switch further includes a beam shaping apparatus; and the method further includes: shaping the input first optical signal by using the beam shaping apparatus; and demultiplexing a shaped first optical signal by using the first WDM apparatus.

In some possible implementations, the optical switch further includes a beam collimation apparatus. The method further includes: performing beam collimation on a demultiplexed first optical signal by using the beam collimation apparatus; and performing optical switching on a beam-collimated first optical signal by using the optical switching apparatus.

In some possible implementations, the optical switch further includes a second WDM apparatus. The method further includes: multiplexing the first sub-signal by using the second WDM apparatus; and outputting a multiplexed first sub-signal by using the second port.

In some possible implementations, the method further includes: transmitting an input second optical signal to the second WDM apparatus by using the second port, where the second optical signal is a multi-wavelength signal; demultiplexing the second optical signal by using the second WDM apparatus; splitting a demultiplexed second optical signal by using the optical splitter, to obtain a third sub-signal and a fourth sub-signal; performing optical switching on the third sub-signal by using the optical switching apparatus; outputting, by using the first port, a third sub-signal obtained after optical switching; and performing optical performance monitoring on the fourth sub-signal by using the optical monitoring apparatus.

In some possible implementations, the performing optical performance monitoring on the second sub-signal by using the optical monitoring apparatus includes: monitoring optical power of each wavelength signal in the second sub-signal by using the optical monitoring apparatus; or monitoring a frequency offset of each wavelength signal in the second sub-signal by using the optical monitoring apparatus.

In some possible implementations, types of the optical monitoring apparatus include at least a PDA, a CCD, and a CMOS. A type of the first WDM apparatus includes at least a grating. Types of the optical switching apparatus include at least an LCOS and an MEMS.

In embodiments of this application, a WDM apparatus, an optical splitter, an optical monitoring apparatus, and an optical switching apparatus are disposed in an internal structure of an optical switch. The WDM apparatus demultiplexes an input optical signal. The optical splitter may split a demultiplexed optical signal into two bundles of signals, where one bundle of signals is input to the optical switching apparatus for optical switching, and the other bundle of signals is input to the optical monitoring apparatus for optical performance monitoring. In this design manner, the optical monitoring apparatus is integrated into the optical switch, and an existing apparatus in the optical switch may be reused to perform optical performance monitoring on the demultiplexed optical signal, so as to implement system miniaturization.

DETAILED DESCRIPTION OF ILLUSTRATIVE EMBODIMENTS

Embodiments of this application provide an optical switch and an optical performance monitoring method based on an optical switch. An optical monitoring apparatus is integrated into the optical switch, and an existing apparatus in the optical switch may be reused to perform optical performance monitoring on a demultiplexed optical signal, so as to implement system miniaturization. In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
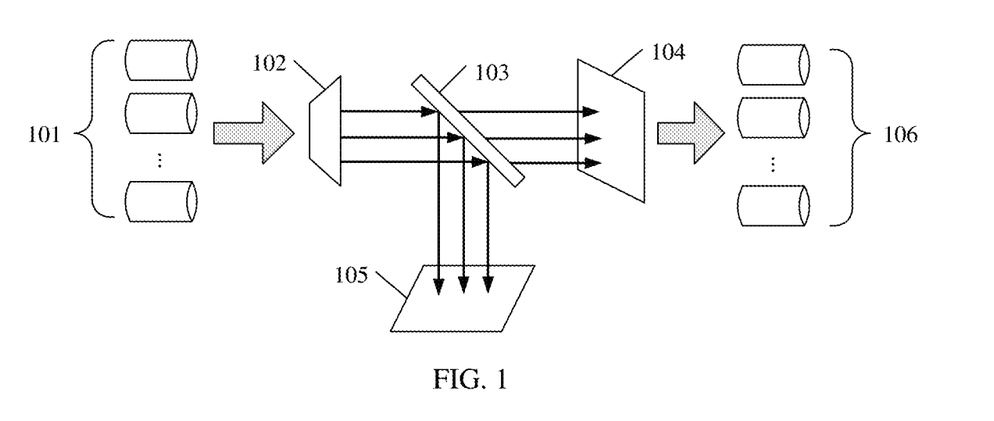
FIG. 1 is a schematic diagram of a structure of a first optical switch according to an embodiment of this application.

FIG. 1 is a schematic diagram of a structure of a first optical switch according to an embodiment of this application. The optical switch includes at least one first port 101, a first wavelength division multiplexing (WDM) apparatus 102, an optical splitter 103, an optical switching apparatus 104, an optical monitoring apparatus 105, and at least one second port 106.

The first port 101 transmits an input first optical signal to the first WDM apparatus 102, where the first optical signal is a multi-wavelength signal. The first WDM apparatus 102 demultiplexes the first optical signal to implement spatial separation of wavelength signals. The optical splitter 103 splits a demultiplexed first optical signal into two signals: a first sub-signal and a second sub-signal, where the first sub-signal is input to the optical switching apparatus 104, and the second sub-signal is input to the optical monitoring apparatus 105. The optical switching apparatus 104 performs optical switching on the first sub-signal, and outputs the signal from the second port 106. The optical monitoring apparatus 105 performs optical performance monitoring (OPM) on the second sub-signal.

Types of the optical monitoring apparatus 105 may include a photodiode array (PDA), a charge coupled device (CCD), a complementary metal-oxide-semiconductor (CMOS), and the like. This is not specifically limited herein. In addition, a control circuit may further be disposed on a peripheral of the optical monitoring apparatus 105, so as to control the optical monitoring apparatus 105 to complete optical-to-electrical conversion.

The following describes a specific manner in which the optical monitoring apparatus 105 implements OPM. For example, a mixer in the optical monitoring apparatus 105 may be first used to mix a local oscillator optical signal with a to-be-monitored optical signal (the second sub-signal), and then input a mixed optical signal to a PDA; and the control circuit controls the PDA to convert the optical signal into an electrical signal, and then inputs the electrical signal to an analog-to-digital converter for sampling, so as to obtain a monitoring signal used for OPM. It should be understood that OPM may include monitoring of a plurality of parameters, where the parameters include optical power, an optical signal-to-noise ratio (OSNR), and the like. This is not specifically limited herein. Optical power monitoring can reflect a basic working status of a channel, and be used to indicate a system to perform automatic power equalization. OSNR monitoring can relatively accurately reflect signal quality. These parameters become important content of optical performance monitoring, and contribute to damage suppression, fault locating, degradation probing, backup, recovery, and the like of an optical network, thereby facilitating stable operation of the optical network.

In a possible implementation, the optical monitoring apparatus 105 may be further configured to correct a frequency offset. Specifically, the optical monitoring apparatus 105 simultaneously monitors multi-wavelength signals in space, frequency offsets of the multi-wavelength signals are uniform, that is, all wavelength signals have a uniform frequency offset. The optical monitoring apparatus 105 may use one wavelength with very high wavelength precision as a reference to correct all the wavelength signals. In addition, a spectrum shape scanned by the optical monitoring apparatus 105 may further be fed back to the optical switching apparatus 104, so that the optical switching apparatus 104 implements real-time spectral filtering correction.

It should be understood that the optical splitter 103 performs splitting based on a proportion of optical power, that is, optical power of the first sub-signal is different from that of the second sub-signal, but a quantity of wavelength signals in the first sub-signal is the same as that in the second sub-signal. For example, the first WDM apparatus 102 performs splitting to obtain 80 wavelength signals, and the two sub-signals obtained by the optical splitter 103 through splitting also include the 80 wavelength signals. In addition, because a main function of the optical switch is to implement optical switching, most of signals obtained through splitting need to be input to the optical switching apparatus 104, and a small part of the signals is input to the optical monitoring apparatus 105. For example, a split ratio of the optical splitter 103 is 98:2, that is, the optical splitter 103 inputs optical signals that occupy 98% of total power to the optical switching apparatus 104, and inputs optical signals that occupy 2% of the total power to the optical monitoring apparatus 105. Generally, optical power of the optical signals input to the optical monitoring apparatus 105 does not exceed 10% of the total power. This application specifically sets no limitation on the split ratio of the optical splitter 103.

In the optical switch shown in FIG. 1 described above, each demultiplexed wavelength signal is first split and then separately undergoes optical switching and optical monitoring. In addition, each demultiplexed wavelength signal may first undergo optical switching. After optical switching, the wavelength signal is split. One bundle of signals obtained after splitting is output from the second port 106, and the other bundle of signals is input to the optical monitoring apparatus 105 for OPM. The following provides further description.

Figure 2:
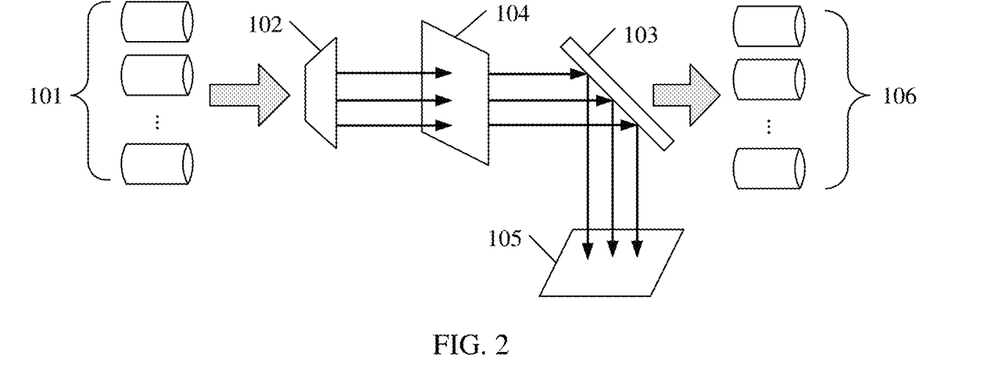
FIG. 2 is a schematic diagram of a structure of a second optical switch according to an embodiment of this application.

FIG. 2 is a schematic diagram of a structure of a second optical switch according to an embodiment of this application. It may be learned from comparison between the structures shown in FIG. 1 and FIG. 2 that a sequence of positions of the optical splitter 103 and the optical switching apparatus 104 changes on an optical path. Specifically, the first port 101 transmits an input first optical signal to the first WDM apparatus 102, where the first optical signal is a multi-wavelength signal. The first WDM apparatus 102 demultiplexes the first optical signal to implement spatial separation of wavelength signals. The optical switching apparatus 104 performs optical switching on each demultiplexed wavelength signal. The optical splitter 103 splits an optical signal obtained after optical switching to obtain two bundles of sub-signals, where one bundle of sub-signals is output from the second port 106, and the other bundle of sub-signals is input to the optical monitoring apparatus 105 for OPM.

Figure 3:
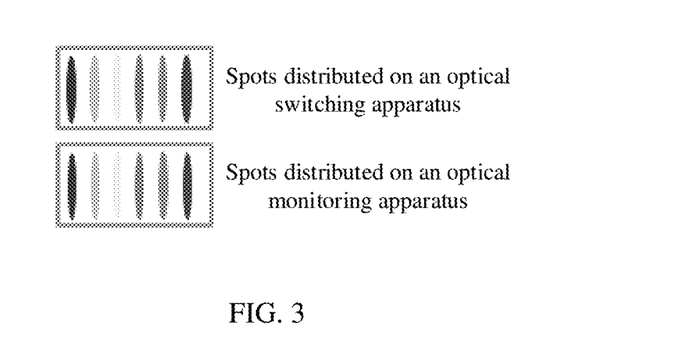
FIG. 3 is a schematic diagram of spots distributed on an optical switching apparatus and an optical monitoring apparatus.

FIG. 3 is a schematic diagram of spots distributed on an optical switching apparatus and an optical monitoring apparatus. It should be understood that, to minimize crosstalk, maximize a separation degree, and optimize distribution linearity between wavelength signals, spots of the wavelength signals distributed on the optical switching apparatus 104 are minimum. Then, a distance between the optical splitter 103 and the optical switching apparatus 104 and a distance between the optical splitter 103 and the optical monitoring apparatus 105 may be adjusted, so that spots distributed on the optical switching apparatus 104 are the same as spots distributed on the optical monitoring apparatus 105. That is, spots of wavelength signals distributed on the optical monitoring apparatus 105 are minimum, so that overlapping between the spots is avoided, and monitoring is easy. In some possible implementations, a lens may alternatively be disposed between the optical splitter 103 and the optical monitoring apparatus 105, so that the spots distributed on the optical switching apparatus 104 are the same as the spots distributed on the optical monitoring apparatus 105. It may be understood that, in actual application, alternatively, the spots distributed on the optical switching apparatus 104 may be partly different from the spots distributed on the optical monitoring apparatus 105. For example, sizes of the spots distributed on the optical switching apparatus 104 are in a specific proportion to sizes of the spots distributed on the optical monitoring apparatus 105. This specifically depends an actual requirement and is not limited herein.

The optical switch provided in this application may specifically refer to a wavelength selective switch (WSS). The optical switching apparatus 104 in the optical switch may be specifically an apparatus for implementing optical cross-connect (OXC), such as a liquid crystal on silicon (LCOS) or a micro-electro-mechanical system (MEMS), which is not specifically limited herein.

Figure 4:
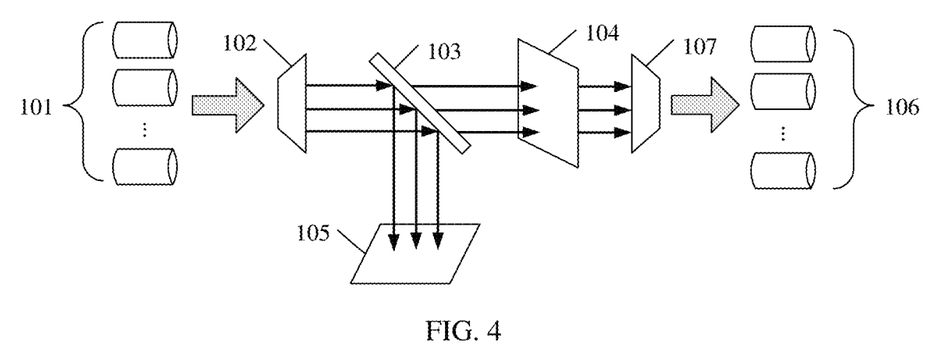
FIG. 4 is a schematic diagram of a structure of a third optical switch according to an embodiment of this application.

FIG. 4 is a schematic diagram of a structure of a third optical switch according to an embodiment of this application. In actual application, each wavelength signal obtained after optical switching is completed also needs to be multiplexed before being output. Therefore, a second WDM apparatus 107 may be further disposed in the optical switch. Specifically, the second WDM apparatus 107 multiplexes each wavelength signal obtained after optical switching before outputting the wavelength signal. For example, 80 wavelength signals obtained after optical switching need to be output from eight ports. In this case, the second WDM apparatus 107 may multiplex the first wavelength signal to the tenth wavelength signal and output them from a port 1, multiplex the eleventh wavelength signal to the twentieth wavelength signal and output them from a port 2, and so on.

It should be understood that the first WDM apparatus 102 may also have a multiplexing function in addition to the described demultiplexing function. Similarly, the second WDM apparatus 107 may also have a demultiplexing function in addition to the described multiplexing function. Specifically, the first WDM apparatus 102 and the second WDM apparatus 107 may be gratings or other apparatuses that spatially separate or combine wavelength signals, which are not limited herein. A WDM apparatus for demultiplexing may also be referred to as a "demultiplexer". A WDM apparatus for multiplexing may also be referred to as a "multiplexer".

The foregoing describes an optical path in which an optical signal is input from a port on one side of an optical switch and is output from a port on the other side. It should be understood that, in actual application, ports on two sides of the optical switch may be mutually input and output ports. That is, the optical path shown in FIG. 4 is reversible, and the following provides further description.

Figure 5:
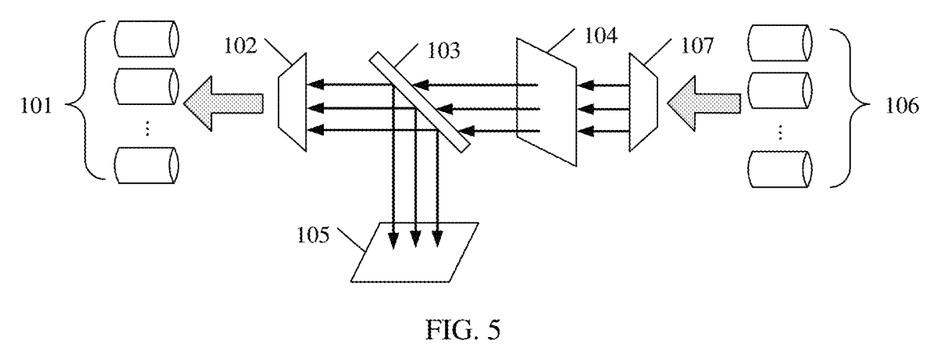
FIG. 5 is a schematic diagram of another optical path of an optical switch according to an embodiment of this application.

FIG. 5 is a schematic diagram of another optical path of an optical switch according to an embodiment of this application. Specifically, the second port 106 transmits an input second optical signal to the second WDM apparatus 107, where the second optical signal is a multi-wavelength signal. The second WDM apparatus 107 demultiplexes the first optical signal to implement spatial separation of wavelength signals. The optical switching apparatus 104 performs optical switching on each demultiplexed wavelength signal. The optical splitter 103 splits an optical signal obtained after optical switching to obtain two bundles of sub-signals, where one bundle of sub-signals is output from the first port 101 after being multiplexed by the first WDM apparatus 102, and the other bundle of sub-signals is input to the optical monitoring apparatus 105 for OPM.

It may be learned with reference to the embodiments shown in FIG. 4 and FIG. 5 that, for an optical switch whose ports on two sides may be mutually input and output ports, the optical switching apparatus 104 therein needs to perform optical switching on optical signals in two different directions. To avoid mutual interference, a plane of the optical switching apparatus 104 may be divided into two regions (for example, a first region and a second region). Wavelength signals from the first port 101 form spots in the first region, and wavelength signals from the second port 106 form spots in the second region. Similarly, the optical monitoring apparatus 105 may also distinguish between wavelength signals from different ports in a similar manner.

It should be understood that the optical switch provided in this embodiment of this application may be a unidirectional optical switch, for example, a 1-in N-out or N-in 1-out optical switch formed by one first port 101 and N second ports 106. In addition, the optical switch provided in this embodiment of this application may be a bidirectional optical switch, for example, an optical switch formed by M first ports 101 and N second ports 106 that can implement M-in N-out and N-in M-out. If the optical switch is a bidirectional optical switch, a WDM apparatus needs to be configured for each of ports on two sides, so as to multiplex an input optical signal before monitoring.

Figure 6:
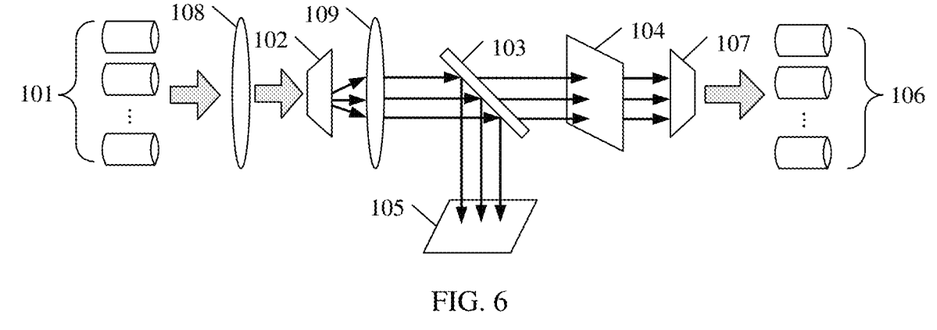
FIG. 6 is a schematic diagram of a structure of a fourth optical switch according to an embodiment of this application.

FIG. 6 is a schematic diagram of a structure of a fourth optical switch according to an embodiment of this application. The optical switch may further be provided with a beam shaping apparatus 108 and a beam collimation apparatus 109. Specifically, the beam shaping apparatus 108 shapes an input optical signal to reduce a beam divergence angle and improve beam quality. The first WDM apparatus 102 demultiplexes a shaped optical signal. Each demultiplexed wavelength signal may be angularly separated in space. Therefore, the beam collimation apparatus 109 may perform beam collimation on each demultiplexed wavelength signal. The optical splitter 103 splits each beam-collimated wavelength signal. The beam shaping apparatus 108 and the beam collimation apparatus 109 may each be a diffractive optical element (DOE), a lens combination, or the like, which is not specifically limited herein.

In embodiments of this application, a WDM apparatus, an optical splitter, an optical monitoring apparatus, and an optical switching apparatus are disposed in an internal structure of an optical switch. The WDM apparatus demultiplexes an input optical signal. The optical splitter may split a demultiplexed optical signal into two bundles of signals, where one bundle of signals is input to the optical switching apparatus for optical switching, and the other bundle of signals is input to the optical monitoring apparatus for optical performance monitoring. In this design manner, the optical monitoring apparatus is integrated into the optical switch, and an existing apparatus in the optical switch may be reused to perform optical performance monitoring on the demultiplexed optical signal, so as to implement system miniaturization. In addition, in this solution, demultiplexing is performed in space, and optical performance monitoring is performed on a plurality of wavelength signals at the same time without a need to perform monitoring on wavelength signals one by one in time, thereby improving monitoring efficiency.

The foregoing describes the optical switch in embodiments of this application. In addition, this application further provides an optical performance monitoring method based on an optical switch.

It should be noted that an optical switch used to implement the optical performance monitoring method may be the optical switch in any one of the embodiments shown in FIG. 1, FIG. 2, FIG. 4, FIG. 5, and FIG. 6. To simplify description, the following separately uses the optical switches shown in FIG. 1 and FIG. 2 as examples to describe the optical performance monitoring method provided in this application.

Figure 7:
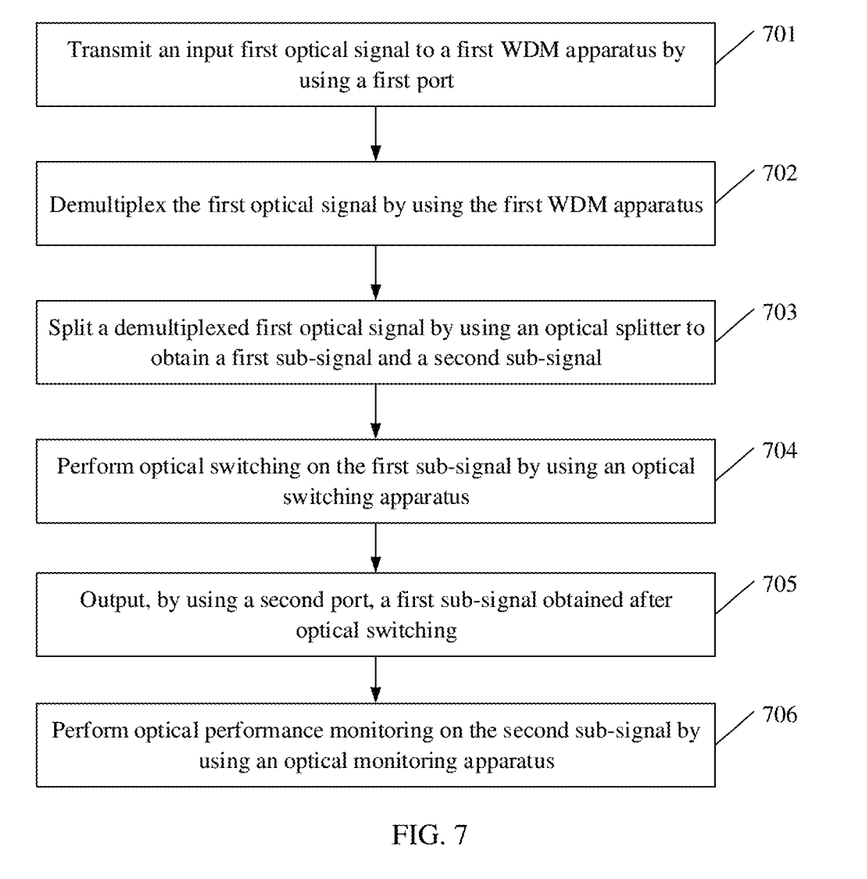
FIG. 7 is a first optical performance monitoring method based on an optical switch according to an embodiment of this application.

FIG. 7 is a first optical performance monitoring method based on an optical switch according to an embodiment of this application. With reference to the optical switch shown in FIG. 1, in this embodiment, the optical performance monitoring method includes the following steps:

701. Transmit an input first optical signal to the first WDM apparatus by using the first port.

702. Demultiplex the first optical signal by using the first WDM apparatus.

It should be understood that the first optical signal is a multi-wavelength signal, and the first WDM apparatus may spatially separate each multi-wavelength signal.

703. Split a demultiplexed first optical signal by using the optical splitter to obtain a first sub-signal and a second sub-signal.

704. Perform optical switching on the first sub-signal by using the optical switching apparatus.

705. Output, by using the second port, a first sub-signal obtained after optical switching.

706. Perform optical performance monitoring on the second sub-signal by using the optical monitoring apparatus.

A distance between the optical splitter and the optical switching apparatus or a distance between the optical splitter and the optical monitoring apparatus may be adjusted, so that spots distributed on the optical switching apparatus are the same as spots distributed on the optical monitoring apparatus. To minimize crosstalk, maximize a separation degree, and optimize distribution linearity between wavelength signals, spots of the wavelength signals distributed on the optical switching apparatus are minimum. Therefore, spots of the wavelength signals distributed on the optical monitoring apparatus are minimum, so that overlapping between the spots is avoided, and monitoring is easy. In some possible implementations, a lens may alternatively be disposed between the optical splitter and the optical monitoring apparatus, so that the spots distributed on the optical switching apparatus are the same as the spots distributed on the optical monitoring apparatus. It may be understood that, in actual application, alternatively, the spots distributed on the optical switching apparatus may be partly different from the spots distributed on the optical monitoring apparatus. For example, sizes of the spots distributed on the optical switching apparatus are in a specific proportion to sizes of the spots distributed on the optical monitoring apparatus. This specifically depends an actual requirement and is not limited herein.

In actual application, each wavelength signal obtained after optical switching is completed also needs to be multiplexed before being output. Therefore, a second WDM apparatus may be further disposed in the optical switch (as shown in FIG. 4). Specifically, the second WDM apparatus may multiplex each wavelength signal obtained after optical switching before outputting the wavelength signal. For example, 80 wavelength signals obtained after optical switching need to be output from eight ports. In this case, the second WDM apparatus 107 may multiplex the first wavelength signal to the tenth wavelength signal and output them from a port 1, multiplex the eleventh wavelength signal to the twentieth wavelength signal and output them from a port 2, and so on.

It should be understood that, ports on two sides of the optical switch may be mutually input and output ports. The foregoing describes the embodiment in which the first port is for input and the second port is for output. The following describes an embodiment in which the second port is for input and the first port is for output. Specifically, referring to FIG. 5, an input second optical signal is transmitted to the second WDM apparatus by using the second port, where the second optical signal is a multi-wavelength signal. The first optical signal is demultiplexed by using the second WDM apparatus, so as to implement spatial separation of wavelength signals. Optical switching is performed each demultiplexed wavelength signal by using the optical switching apparatus. An optical signal obtained after optical switching is split by using the optical splitter to obtain two bundles of sub-signals, where one bundle of sub-signals is output from the first port 101 after being multiplexed by the first WDM apparatus, and the other bundle of sub-signals is input to the optical monitoring apparatus 105 for optical performance monitoring.

Figure 8:
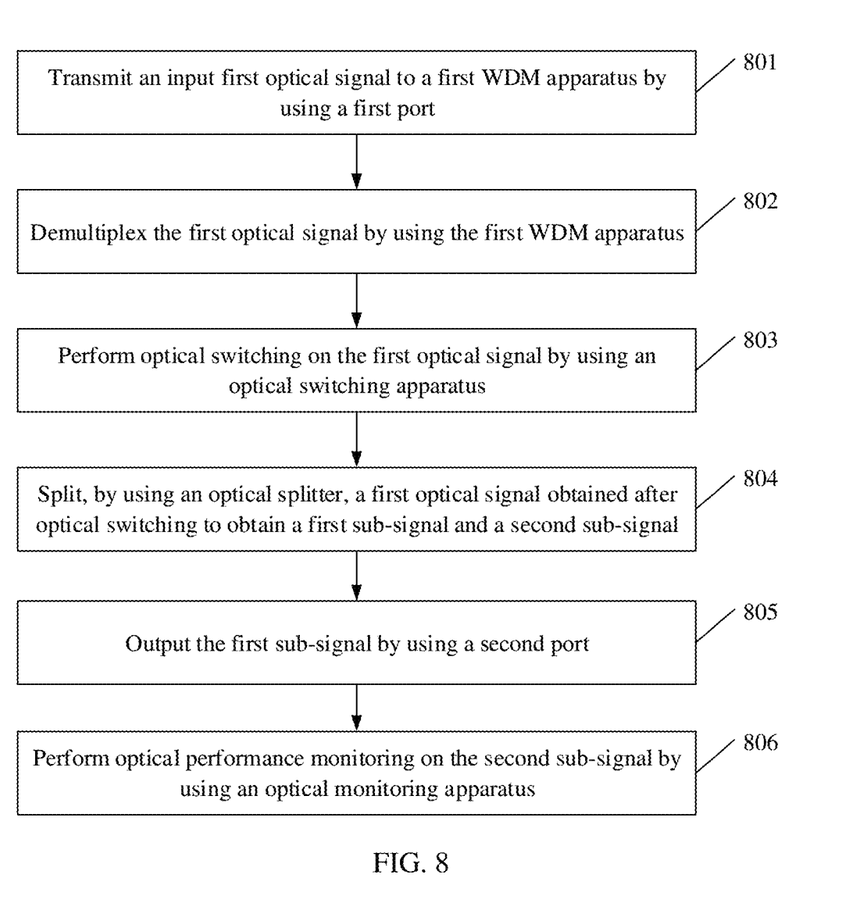
FIG. 8 is a second optical performance monitoring method based on an optical switch according to an embodiment of this application.

FIG. 8 is a second optical performance monitoring method based on an optical switch according to an embodiment of this application. With reference to the optical switch shown in FIG. 2, in this embodiment, the optical performance monitoring method includes the following steps:

801. Transmit an input first optical signal to the first WDM apparatus by using the first port.

802. Demultiplex the first optical signal by using the first WDM apparatus.

803. Perform optical switching on the first optical signal by using the optical switching apparatus.

804. Split, by using the optical splitter, a first optical signal obtained after optical switching to obtain a first sub-signal and a second sub-signal.

805. Output the first sub-signal by using the second port.

806. Perform optical performance monitoring on the second sub-signal by using the optical monitoring apparatus.

It should be noted that a main difference between the embodiment shown in FIG. 8 and the embodiment shown in FIG. 7 lies in that a sequence of positions of the optical splitter and the optical switching apparatus changes on an optical path. For details, refer to the optical switch shown in FIG. 1 and the optical switch shown in FIG. 2. That is, in the embodiment shown in FIG. 7, the optical splitter first splits the demultiplexed optical signal, and then the optical switching apparatus performs optical switching on one bundle of signals obtained after splitting. In the embodiment shown in FIG. 8, the optical switching apparatus first performs optical switching on the demultiplexed optical signal, and then the optical splitter splits the optical signal obtained after optical switching. Except the foregoing difference, other aspects are similar to those in the embodiment shown in FIG. 7, and details are not described herein again.

It should be noted that in addition to the foregoing described optical performance monitoring by using the optical switches shown in FIG. 1 and FIG. 2, for another optical performance monitoring method based on the optical switches in the embodiments shown in FIG. 4 to FIG. 6, refer to related descriptions in the embodiment parts shown in FIG. 4 to FIG. 6. Details are not described herein again.

It should be noted that the foregoing embodiments are merely used to describe the technical solutions of this application, but do not constitute limitations thereon. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A device, comprising:
a first wavelength division multiplexer (WDM);
a first port, configured to transmit an input first optical signal to the first WDM, wherein the first optical signal is a multi-wavelength signal;
a second port;
an optical splitter;
an optical monitor;
an optical switch; and
a second WDM, wherein the optical splitter and the optical switch are disposed along an optical path between the first WDM and the second WDM;
wherein the first WDM is configured to demultiplex the first optical signal, to obtain a demultiplexed first optical signal, wherein the demultiplexed first optical signal comprises multiple spatially separated wavelength signals;
wherein the optical splitter is configured to split the demultiplexed first optical signal to obtain a first sub-signal and a second sub-signal, wherein a quantity of spatially separated wavelength signals in the second sub-signal is the same as that in the demultiplexed first optical signal;
wherein the optical switch is configured to perform optical switching on the first sub-signal;
wherein the second WDM is configured to multiplex the first sub-signal obtained after optical switching, to obtain a multiplexed first sub-signal;
wherein the second port is configured to output the multiplexed first sub-signal; and
wherein the optical monitor is configured to perform optical performance monitoring on the second sub-signal.

2. The device according to claim 1, wherein spots of the first sub-signal distributed on the optical switch are the same as spots of the second sub-signal distributed on the optical monitor.

3. The device according to claim 1, further comprising:
a first optical element, configured to shape the input first optical signal, to obtain a shaped first optical signal, wherein the first optical element is a lens combination or a diffractive optical element; and
wherein the first WDM is configured to demultiplex the shaped first optical signal.

4. The device according to claim 3, further comprising:
a second optical element, configured to perform beam collimation on the demultiplexed first optical signal, to obtain a beam-collimated first optical signal, wherein the second optical element is a lens combination or a diffractive optical element; and
wherein the optical splitter is configured to split the beam-collimated first optical signal, to obtain the first sub-signal and the second sub-signal.

5. The device according to claim 1, wherein:
the second port is further configured to transmit an input second optical signal to the second WDM, wherein the second optical signal is a multi-wavelength signal;
the second WDM is further configured to demultiplex the second optical signal, to obtain a demultiplexed second optical signal, wherein the demultiplexed second optical signal comprises multiple spatially separated wavelength signals;
the optical switch is further configured to perform optical switching on the demultiplexed second optical signal;
the optical splitter is further configured to split a second optical signal obtained after optical switching to obtain a third sub-signal and a fourth sub-signal;
the first WDM is further configured to multiplex the third sub-signal, to obtain a multiplexed third sub-signal;
the first port is further configured to output the multiplexed third sub-signal; and
the optical monitor is configured to perform optical performance monitoring on the fourth sub-signal.

6. The device according to claim 1, wherein the optical monitor is configured to:
monitor optical power of each wavelength signal in the second sub-signal.

7. The device according to claim 1, wherein the optical monitor is configured to:
monitor a frequency offset of each wavelength signal in the second sub-signal.

8. The device according to claim 1, wherein:
the optical monitor comprises a photodiode array (PDA), a charge coupled device (CCD), or a complementary metal-oxide-semiconductor CMOS;
the first WDM comprises a grating; and
the optical switch comprises a liquid crystal on silicon (LCOS) or a micro-electro-mechanical system (MEMS).

9. A device, comprising:
a first wavelength division multiplexer (WDM);
a first port, configured to transmit an input first optical signal to the first WDM, wherein the first optical signal is a multi-wavelength signal;
a second port;

an optical splitter;
an optical monitor;
an optical switch; and
a second WDM, wherein the optical splitter and the optical switch are disposed along an optical path between the first WDM and the second WDM;
wherein the first WDM is configured to demultiplex the first optical signal, to obtain a demultiplexed first optical signal, wherein the demultiplexed first optical signal comprises multiple spatially separated wavelength signals;
wherein the optical switch is configured to perform optical switching on the demultiplexed first optical signal;
wherein the optical splitter is configured to split a first optical signal obtained after optical switching to obtain a first sub-signal and a second sub-signal;
wherein the second WDM is configured to multiplex the first sub-signal obtained after optical switching, to obtain a multiplexed first sub-signal;
wherein the second port is configured to output the multiplexed first sub-signal; and
wherein the optical monitor is configured to perform optical performance monitoring on the second sub-signal.

10. The device according to claim 9, wherein spots of the first optical signal distributed on the optical switch are the same as spots of the second sub-signal distributed on the optical monitor.

11. The device according to claim 9, wherein:
the second port is further configured to transmit an input second optical signal to the second WDM, wherein the second optical signal is a multi-wavelength signal;
the second WDM is further configured to demultiplex the second optical signal, to obtain a demultiplexed second optical signal, wherein the demultiplexed second optical signal comprises multiple spatially separated wavelength signals;
the optical splitter is further configured to split the demultiplexed second optical signal to obtain a third sub-signal and a fourth sub-signal;
the optical switch is further configured to perform optical switching on the third sub-signal;
the first port is further configured to output a third sub-signal obtained after optical switching; and
the optical monitor is further configured to perform optical performance monitoring on the fourth sub-signal.

12. The device according to claim 9, further comprising:
a first optical element, configured to shape the input first optical signal, to obtain a shaped first optical signal, wherein the first optical element is a lens combination or a diffractive optical element; and
wherein the first WDM is configured to demultiplex the shaped first optical signal.

13. The device according to claim 12, further comprising:
a second optical element, configured to perform beam collimation on the demultiplexed first optical signal, to obtain a beam-collimated first optical signal, wherein the second optical element is a lens combination or a diffractive optical element; and
wherein the optical splitter is configured to split the beam-collimated first optical signal, to obtain the first sub-signal and the second sub-signal.

14. The device according to claim 9, wherein:
the optical monitor comprises a photodiode array (PDA), a charge coupled device (CCD), or a complementary metal-oxide-semiconductor CMOS;
the first WDM comprises a grating; and
the optical switch comprises a liquid crystal on silicon (LCOS) or a micro-electro-mechanical system (MEMS).

15. A method, comprising:
transmitting an input first optical signal to a first wavelength division multiplexer (WDM) using a first port, wherein the first optical signal is a multi-wavelength signal, and a device comprises the first port, a second port, the first WDM, an optical splitter, an optical monitor, an optical switch, and a second WDM, wherein the optical splitter and the optical switch are disposed along an optical path between the first WDM and the second WDM;
demultiplexing the first optical signal by using the first WDM, to obtain a demultiplexed first optical signal, wherein the demultiplexed first optical signal comprises multiple spatially separated wavelength signals;
splitting the demultiplexed first optical signal by using the optical splitter, to obtain a first sub-signal and a second sub-signal, wherein a quantity of spatially separated wavelength signals in the second sub-signal is the same as that in the demultiplexed first optical signal;
performing optical switching on the first sub-signal by using the optical switch;
multiplexing, by the second WDM, the first sub-signal obtained after the performing the optical switching, to obtain a multiplexed first sub-signal;
outputting, by using the second port, the multiplexed first sub-signal; and
performing optical performance monitoring on the second sub-signal by using the optical monitor.

16. The method according to claim 15, wherein spots of the first sub-signal distributed on the optical switch are the same as spots of the second sub-signal distributed on the optical monitor.

17. The method according to claim 15, further comprising:
shaping the input first optical signal, to obtain a shaped first optical signal; and
wherein demultiplexing the first optical signal by using the first WDM comprises demultiplexing the shaped first optical signal by using the first WDM.

18. The method according to claim 15, further comprising:
performing beam collimation on the demultiplexed first optical signal, to obtain a beam-collimated first optical signal; and
wherein splitting the demultiplexed first optical signal by using the optical splitter comprises splitting the beam-collimated first optical signal by using the optical splitter.

19. A method, comprising:
transmitting an input first optical signal to a first wavelength division multiplexer (WDM) using a first port, wherein the first optical signal is a multi-wavelength signal, and wherein a device comprises the first port, a second port, the first WDM, an optical splitter, an optical monitor, an optical switch, and a second WDM, wherein the optical splitter and the optical switch are disposed along an optical path between the first WDM and the second WDM;
demultiplexing the first optical signal by using the first WDM, to obtain a demultiplexed first optical signal, wherein the demultiplexed first optical signal comprises multiple spatially separated wavelength signals;
performing optical switching on the demultiplexed first optical signal by using the optical switch;

splitting, by using the optical splitter, a first optical signal obtained after optical switching to obtain a first sub-signal and a second sub-signal;

multiplexing, by the second WDM, the first sub-signal obtained after the performing the optical switching, to obtain a multiplexed first sub-signal;

outputting the multiplexed first sub-signal by using the second port; and performing optical performance monitoring on the second sub-signal by using the optical monitor.

20. The method according to claim 19, wherein spots of the first sub-signal distributed on the optical switch are the same as spots of the second sub-signal distributed on the optical monitor.

* * * * *